United States Patent
Xu et al.

(10) Patent No.: US 10,484,841 B2
(45) Date of Patent: Nov. 19, 2019

(54) LTE CLUSTER COMMUNICATION METHOD, USER EQUIPMENT, AND FIRST NETWORK ELEMENT EQUIPMENT

(71) Applicant: ZTE CORPORATION, Shenzhen, Guangdong Province (CN)

(72) Inventors: Hui Xu, Shenzhen (CN); Zijiang Ma, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 286 days.

(21) Appl. No.: 15/505,927

(22) PCT Filed: Oct. 21, 2014

(86) PCT No.: PCT/CN2014/089021
§ 371 (c)(1),
(2) Date: Jul. 5, 2017

(87) PCT Pub. No.: WO2015/117375
PCT Pub. Date: Aug. 13, 2015

(65) Prior Publication Data
US 2017/0303098 A1    Oct. 19, 2017

(30) Foreign Application Priority Data
Aug. 25, 2014   (CN) .......................... 2014 1 0421107

(51) Int. Cl.
*H04W 4/10* (2009.01)
*H04W 4/06* (2009.01)
(Continued)

(52) U.S. Cl.
CPC .............. *H04W 4/10* (2013.01); *H04W 4/06* (2013.01); *H04W 36/00* (2013.01);
(Continued)

(58) Field of Classification Search
None
See application file for complete search history.

(56) References Cited

U.S. PATENT DOCUMENTS

2011/0116433 A1* 5/2011 Dorenbosch ........ H04W 72/005
370/312
2013/0121133 A1   5/2013 Anchan et al.
(Continued)

FOREIGN PATENT DOCUMENTS

| CN | 102318232 A | 1/2012 |
|---|---|---|
| CN | 103118334 A | 5/2013 |
| WO | 2013178158 A1 | 12/2013 |

OTHER PUBLICATIONS

ZTE, Broadcom, Group Communication with Configurable Geo Scope using IMS and eMBMS, SA WG2 Temporary Document, SA WG2 Meeting #99, Sep. 23-27, 2013, Xiamen, China, S2-133101 XP050726527.

*Primary Examiner* — Huy D Vu
*Assistant Examiner* — Bao G Nguyen
(74) *Attorney, Agent, or Firm* — Cantor Colburn LLP (57) ABSTRACT

A method for LTE trunking communication, a user equipment and a first network element device are disclosed. The method includes: when a user equipment which is ready to receive trunked service data through a multimedia broadcast/multicast service (MBMS) bearer moves between a cell inside an MBMS single frequency network (MBSFN) area where a trunked service is located and a cell outside the MBMFN area, reporting area identifier information of the user equipment; and the user equipment receiving the trunked service data according to a trunked service bearing mode selected by a network side based on the received area identifier information.

12 Claims, 7 Drawing Sheets

(51) Int. Cl.
*H04W 76/20* (2018.01)
*H04W 76/10* (2018.01)
*H04W 84/08* (2009.01)
*H04W 88/02* (2009.01)
*H04W 36/00* (2009.01)

(52) U.S. Cl.
CPC ....... *H04W 36/0007* (2018.08); *H04W 76/10* (2018.02); *H04W 76/20* (2018.02); *H04W 84/08* (2013.01); *H04W 88/02* (2013.01)

(56) References Cited

U.S. PATENT DOCUMENTS

| | | | |
|---|---|---|---|
| 2014/0086173 A1 | 3/2014 | Sadeghi et al. | |
| 2014/0120973 A1* | 5/2014 | Agulnik | H04W 4/06 455/509 |
| 2014/0177506 A1* | 6/2014 | Korus | H04W 4/06 370/312 |
| 2015/0373506 A1* | 12/2015 | Jung | H04L 12/189 370/312 |

* cited by examiner

LTE CLUSTER COMMUNICATION METHOD, USER EQUIPMENT, AND FIRST NETWORK ELEMENT EQUIPMENT

TECHNICAL FIELD

The present document relates to trunking communication technologies, and in particularly, to a method for LTE trunking communication, a user equipment and a first network element device.

BACKGROUND

Trunking communication systems are private wireless communication systems, which are developed in order to satisfy command and dispatch requirements of users and targets specific industry applications, and in which a large number of wireless users share a small quantity of wireless channels and which are multi-purpose, high performance wireless communication systems using command and dispatch as a main application. The trunking communication systems have wide application markets in fields such as government departments, public security, emergency communications, electric power, civil aviation, petrochemical industries and armies.

The trunking communication systems experience a similar development history to cellular mobile communication systems. The first generation trunking communication systems are simulation trunking communication systems supporting mainly voice communication. The simulation trunking communication systems entering China the earliest are Actionet systems from Nokia, which use MPT-1327 signaling to be applied in a 450 MHz frequency band. Hereafter, F.A.S.T from Japan and Smartnet from U.S. Motorola enter China and occupy more than 80% of the market share of our trunked market over a long period of time.

The second generation trunked systems are narrowband digital trunking communication systems rising in the 1990s and beginning to be deployed in China around 2004, and are trunking communication systems applied most widely at present in China. The digital trunking communication systems support voice and low speed data (at most 28.8 kbps) communications, and representative systems are terrestrial trunked radio (TETRA) systems defined by the European Telecommunications Standards Institute (ETSI), integrated digital enhanced networks (iDEN) systems of Motorola in USA, and two types of domestic trunked architectures, global open trunking architectures (GoTa) developed based on CDMAIX and GT800 systems developed based on GSM, respectively. From the domestic point of view, the growth of TETRA networks is the fastest in last two or three years. The number of the TETRA networks accounts for more than about ⅔ in the established digital trunking communication networks all over the country.

The trunked systems are different from public systems in that the trunked systems need to have efficient command and dispatch characteristics and require that the networks have high reliability and security.

Call control: a service bearer is established, maintained and released between a calling user and a called user according to a service request of the user.

Authentication and certification: authentication and certification are supported. Authentication functions include authentication of a terminal by a network side and two-way authentication of the terminal by the network side and of the network side by the terminal.

Fail soft: when a link between the network side and a base station or between network elements internal to the network side fails, the base station can provide limited trunked services for user terminals within its coverage range.

Figure 1:
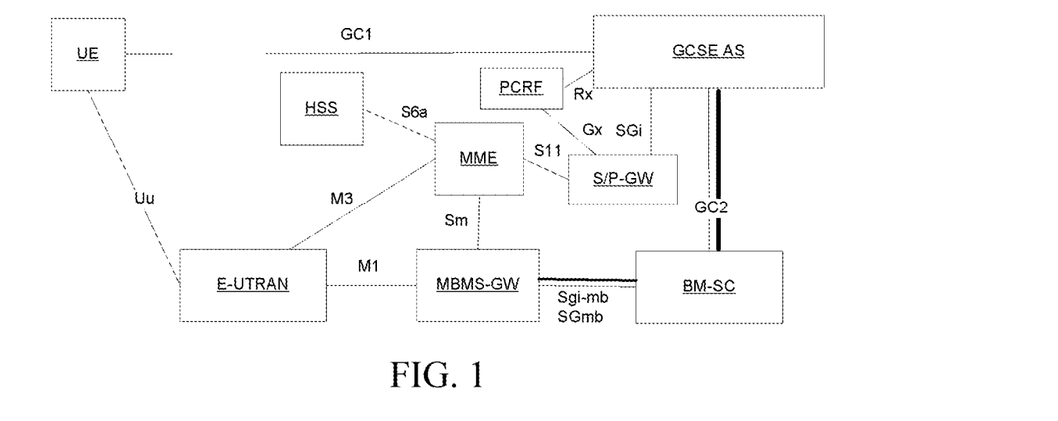
FIG. 1 is a schematic diagram of a trunking communication system of the related art.

Network interconnection and intercommunication functions: the ability of intercommunicating with Public Switched Telephone Networks (PSTNs), public mobile communication systems (GSM/CDMA, TD-LTE, etc.), IP phones and other standard trunking communication systems. Trunking communication in 3GPP LTE is referred to as group communication service enabler (GCSE), the system architecture of which is shown in FIG. 1.

In order to utilize mobile network resources efficiently, the $3^{rd}$ generation partnership project (3GPP) proposes a multimedia broadcast multicast service (MBMS), which is a technology for transferring data from one data source to a plurality of target mobile terminals to implement sharing of the network (including a core network and an access network) resources, thereby improving the utilization of the network resources (especially air interface resources). The MBMS defined by the 3GPP can not only implement low speed message class multicast and broadcast of plain texts, but also implement high speed broadcast and multicast of multimedia services to provide a variety of rich video, audio and multimedia services. This undoubtedly complies with trend of development of future mobile data and provides a better business prospect for development of the 3G.

Figure 2:
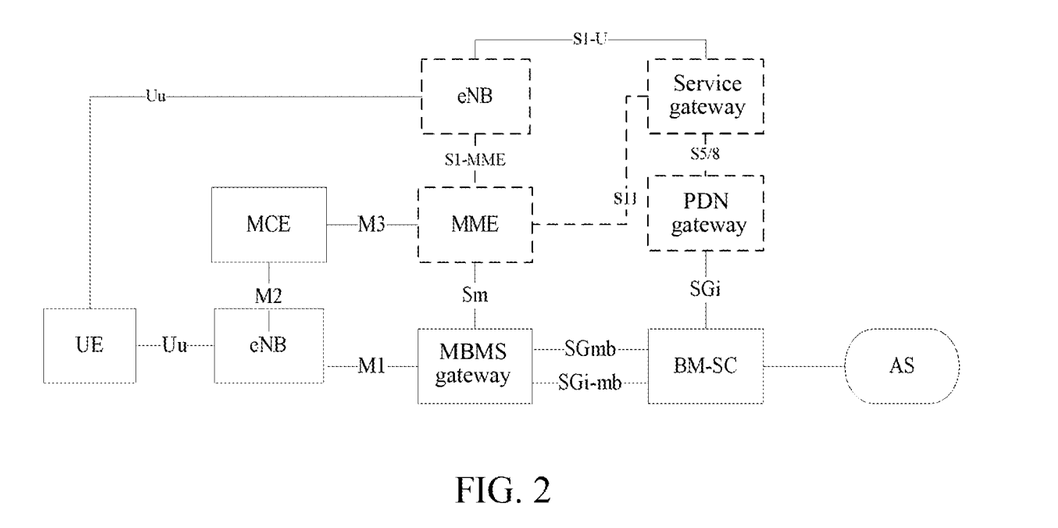
FIG. 2 is a schematic diagram of an MBMS communication structure of the related art.

The characteristics of the MBMS are large data volume of the services, long duration when a mobile terminal receives data and constant average data rate. The characteristics described above determine that both scheduling of the MBMS and control signaling configuration are semi-static, i.e., both scheduling information of the MBMS and control signaling information remain unchanged for a long time. Both information is sent periodically through a MBMS control channel (MCCH) and is collectively called MCCH information. A plurality of MCCHs may exist in an evolved MBMS (eMBMS) system, each MCCH corresponding to a different multicast/broadcast single frequency network (MBSFN) area, where only control information of the MBMS sent in the corresponding MBSFN area is born. FIG. 2 shows a schematic diagram of an MBMS structure in a LTE system.

At present, the industry is discussing the possibility of implementing trunking communication using the MBMS technology. In this application scenario, the following problem is found to exist in the related art during the research and practice of the related art.

The problem of how to ensure that UE can receive the required trunked service in time when the UE which is ready to receive the trunked service through an MBMS bearer moves inside and outside of the MBSFN area has not been solved yet.

SUMMARY

In view of this, embodiments of the present document provides a method for LTE trunking communication, a user equipment (UE) and a first network element device, so as to ensure that the UE can receive the required trunked service in time.

A method for LTE trunking communication includes: reporting area identifier information of a user equipment when the user equipment, which is ready to receive trunked service data through a multimedia broadcast/multicast service (MBMS) bearer, moves between a cell inside an MBMS single frequency network (MBSFN) area at which a trunked service is located and a cell outside the MBMFN area; and the user equipment receiving the trunked service data according to a trunked service bearing mode selected by a network side based on the received area identifier information.

In an exemplary embodiment, the user equipment receiving the trunked service data according to the trunked service bearing mode selected by the network side based on the received area identifier information includes: the user equipment receiving the trunked service data through a unicast bearer when the trunked service bearing mode is the unicast bearer; or the user equipment receiving the trunked service data through the MBMS bearer when the trunked service bearing mode is the MBMS bearer.

In an exemplary embodiment, the method further includes: the user equipment determining to leave the MBSFN area by any one of the following ways: the user equipment does not find or is unable to read in a local cell or an adjacent cell a related system broadcast message which is for configuring MBMS parameters; the user equipment does not find or is unable to read a multicast control channel (MCCH) in a local cell or an adjacent cell; the user equipment finds in a local cell or an adjacent cell by reading a system broadcast message that a MBMS area to which the local cell or the adjacent cell belongs does not belong to a broadcast area of the trunked service; and the user equipment does not have configuration parameters of the trunked service in an MCCH read in a local cell or an adjacent cell.

In an exemplary embodiment, the area identifier information of the user equipment is reported using a manner of an application layer signaling or an evolved packet system (EPS) signaling; and the EPS signaling comprises an air interface signaling and an evolved packet core network (EPC) signaling.

In an exemplary embodiment, the area identifier information is an identifier of a cell at which the user equipment is located.

In an exemplary embodiment, the area identifier information comprises at least one of a trunked service identifier and a Boolean identifier.

In an exemplary embodiment, the area identifier information further includes at least one of an MBMS service area identifier (SAI) and a geographic position identifier.

A user equipment includes: a reporting unit, arranged to report area identifier information of a user equipment when the user equipment which is ready to receive trunked service data through a multimedia broadcast/multicast service (MBMS) bearer moves between a cell inside an MBMS single frequency network (MBSFN) area at which a trunked service is located and a cell outside the MBMFN area; and a receiving unit, arranged to receive the trunked service data according to a trunked service bearing mode selected by a network side based on the received area identifier information.

In an exemplary embodiment, the receiving unit is arranged to receive the trunked service data through a unicast bearer when the trunked service bearing mode is the unicast bearer, or receive the trunked service data through the MBMS bearer when the trunked service bearing mode is the MBMS bearer.

In an exemplary embodiment, the reporting unit further includes: a determining sub-unit, arranged to determine that the user equipment leaves the MBSFN area by any one of the following ways: the user equipment does not find or is unable to read in a local cell or an adjacent cell a related system broadcast message which is for configuring MBMS parameters; the user equipment does not find or is unable to read a multicast control channel (MCCH) in a local cell or an adjacent cell; the user equipment finds in a local cell or an adjacent cell by reading a system broadcast message that a MBMS area to which the local cell or the adjacent cell belongs does not belong to a broadcast area of the trunked service; and the user equipment does not have configuration parameters of the trunked service in an MCCH read in a local cell or an adjacent cell.

In an exemplary embodiment, the reporting unit further includes: a reporting sub-unit, arranged to report the area identifier information of the user equipment using a manner of an application layer signaling or an evolved packet system (EPS) signaling; and wherein the EPS signaling comprises an air interface signaling and an evolved packet core network (EPC) signaling.

In an exemplary embodiment, the area identifier information is an identifier of a cell at which the user equipment is located.

In an exemplary embodiment, the area identifier information includes at least one of a trunked service identifier and a Boolean identifier.

In an exemplary embodiment, the area identifier information further includes at least one of an MBMS service area identifier (SAI) and a geographic position identifier.

A method for LTE trunking communication includes: a first network element device receiving area identifier information reported by a user equipment which is ready to receive trunked service data through a multimedia broadcast/multicast service (MBMS) bearer; the first network element device selecting a trunked service bearing mode according to the area identifier information; and the first network element device sending the trunked service data through the selected trunked service bearing mode.

In an exemplary embodiment, the first network element device selecting the trunked service bearing mode according to the area identifier information includes: the first network element device judging whether to use a unicast bearer according to the area identifier information, selecting the unicast bearer as the trunked service bearing mode if determining that there is no available MBMS bearer or establishable MBMS bearer, and selecting the MBMS bearer as the trunked service bearing mode if determining that there is an available MBMS bearer or establishable MBMS bearer.

In an exemplary embodiment, it is determined that there is the available MBMS bearer if the user equipment is in an MBMS coverage area and a trunked service has not begun yet; and it is determined that there is the establishable MBMS bearer if the user equipment is not in an MBMS coverage area, a trunked service has not begun yet, and a network is able to configure a cell at which the user equipment is located as a new MBMS single frequency network (MBSFN) area or enlarge the original MBSFN area containing the cell at which the user equipment is located.

In an exemplary embodiment, in the case that the user equipment moves to the outside of the MBSFN area and sends the area identifier information, the first network element device sending the trunked service data through the selected trunked service bearing mode includes: the first network element device judging whether to send the trunked service data through the MBMS bearer, the first network element device sending indication information to a second network element device if yes, and sending the trunked service data through a unicast bearer if no.

In an exemplary embodiment, the method further includes: after the first network element device sends the indication information to the second network element device, the second network element device judging whether to establish a new MBSFN area, configuring the newly established MBSFN area to send the trunked service data if yes, and modifying the original MBSFN area to send the trunked service data if no.

In an exemplary embodiment, in the case that the user equipment moves back to the MBSFN area and sends the area identifier information, the first network element device sending the trunked service data through the selected trunked service bearing mode includes: the first network element device judging whether to send the trunked service data through the MBMS bearer, sending the trunked service data through the MBMS bearer if yes, and the first network element device sending indication information to a second network element device if no.

In an exemplary embodiment, the method further includes: after the first network element device sends the indication information to the second network element device, the second network element device modifying the MBSFN area, and the first network element device sending the trunked service data through the unicast bearer.

A first network element device includes: an information receiving unit, arranged to receive area identifier information reported by a user equipment which is ready to receive trunked service data through a multimedia broadcast/multicast service (MBMS) bearer; a selecting unit, arranged to select a trunked service bearing mode according to the area identifier information; and a sending unit, arranged to send the trunked service data through the selected trunked service bearing mode.

In an exemplary embodiment, the selecting unit is arranged to judge whether to use a unicast bearer according to the area identifier information, select the unicast bearer as the trunked service bearing mode if determining that there is no available MBMS bearer or establishable MBMS bearer, and select the MBMS bearer as the trunked service bearing mode if determining that there is an available MBMS bearer or establishable MBMS bearer.

In an exemplary embodiment, the selecting unit is arranged to: determine that there is the available MBMS bearer if the user equipment is in an MBMS coverage area and a trunked service has not begun yet; and determine that there is the establishable MBMS bearer if the user equipment is not in an MBMS coverage area, a trunked service has not begun yet, and a network is able to configure a cell at which the user equipment is located as a new MBMS single frequency network (MBSFN) area or enlarge the original MBSFN area containing the cell at which the user equipment is located.

In an exemplary embodiment, the sending unit is arranged to, in the case that the user equipment moves to the outside of the MBSFN area and sends the area identifier information, judge whether to send the trunked service data through the MBMS bearer, send indication information to a second network element device if yes, and send the trunked service data through a unicast bearer if no.

In an exemplary embodiment, the first network element device further includes: an indication unit, arranged to, after the sending unit sends the indication information to the second network element device, receive an indication sent after the second network element device judges whether to establish a new MBSFN area, indicate to send the trunked service data in the newly established MBSFN area if yes, and indicate to modify the original MBSFN area and send the trunked service data if no.

In an exemplary embodiment, the sending unit is arranged to, in the case that the user equipment moves back to the MBSFN area and sends the area identifier information, judge whether to send the trunked service data through the MBMS bearer, send the trunked service data through the MBMS bearer if yes, and send indication information to a second network element device if no.

In an exemplary embodiment, the first network element device further includes: an indication unit, arranged to, after the sending unit sends the indication information to the second network element device, receive an indication from the second network element device that the trunked service data is sent through the unicast bearer.

An embodiment of the present document further provides a computer program including program instructions, enabling a user equipment, when the program instructions are executed by the user equipment, to execute the method described above.

An embodiment of the present document further provides a computer program including program instructions, enabling a first network element device, when the program instructions are executed by the first network element device, to execute the method described above.

An embodiment of the present document further provides a computer readable storage device storing any one of computer programs described above therein.

The method in accordance with the embodiment of present document includes: when the user equipment, which is ready to receive the trunked service data through a MBMS bearer, moves between different cells which are inside and outside an MBSFN area where a trunked service is located, reporting area identifier information of the user equipment; and the UE receiving the trunked service data according to a trunked service bearing mode selected by a network side based on the received area identifier information. Using the embodiments of the present document, when the position of the UE is changed and the UE moves between the different cells inside and outside the MBSFN area where the trunked service is located, the area identifier information of the user equipment is reported to the network side, and the network side sends the trunked service bearing mode to the UE, such that the UE can receive the trunked service data according to the trunked service bearing mode, to ensure that the UE can receive the required trunked services in time.

DETAILED DESCRIPTION

The implementation of the technique scheme will be described in detail in conjunction with the accompanying drawings. Embodiments of the present application and features in the embodiments can be combined with each other arbitrarily without conflict.

Figure 3:
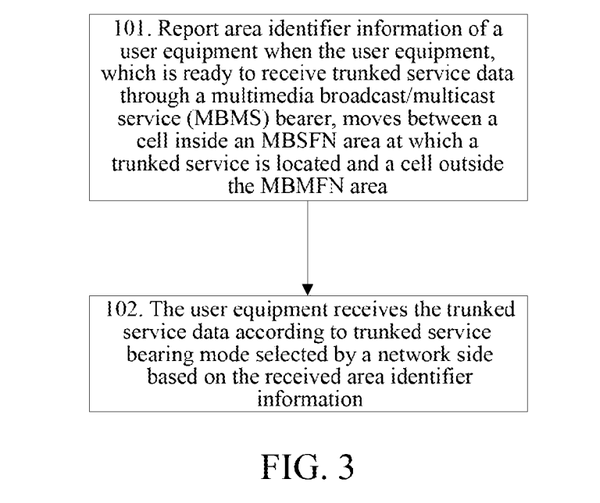
FIG. 3 is a flow chart of an implementation of a method embodiment of the present document.

An embodiment of the present document provides a method for LTE trunking communication, and as shown in FIG. 3, the method includes the following steps.

In a step 101: when a user equipment, which is ready to receive trunked service data through a multimedia broadcast/multicast service (MBMS) bearer, moves between a cell inside an MBSFN area where a trunked service is located and a cell outside the MBMFN area, it reports area identifier information of the user equipment.

In a step 102: the user equipment receives the trunked service data according to a trunked service bearing mode selected by a network side based on the received area identifier information.

In an alternative implementation mode of the embodiment of the present document, the step 102 may include the following steps.

The user equipment receives the trunked service data through a unicast bearer when the trunked service bearing mode is the unicast bearer; or the user equipment receives the trunked service data through the MBMS bearer when the trunked service bearing mode is the MBMS bearer.

In an alternative implementation mode of the embodiment of the present document, the method further includes: the user equipment determining to leave the MBSFN area by any one of the following ways: the user equipment does not find or is unable to read in a local cell or an adjacent cell a related system broadcast message which is for configuring MBMS parameters; the user equipment does not find or is unable to read a multicast control channel (MCCH) in a local cell or an adjacent cell; the user equipment finds in a local cell or an adjacent cell by reading a system broadcast message that a MBMS area to which the local cell or the adjacent cell belongs does not belong to a broadcast area of the trunked service; and the user equipment does not have configuration parameters of the trunked service in an MCCH read in a local cell or an adjacent cell.

In an alternative implementation mode of the embodiment of the present document, the area identifier information of the user equipment is reported at least using a manner of an application layer signaling or an evolved packet system (EPS) signaling; and the EPS signaling includes an air interface signaling and an evolved packet core network (EPC) signaling.

In an alternative implementation mode of the embodiment of the present document, the area identifier information is an identifier of a cell at which the user equipment is located.

In an alternative implementation mode of the embodiment of the present document the area identifier information includes at least one of a trunked service identifier and a Boolean identifier.

In an alternative implementation mode of the embodiment of the present document, the area identifier information further includes at least one of an MBMS service area identifier (SAI) and a geographic position identifier.

Figure 4:
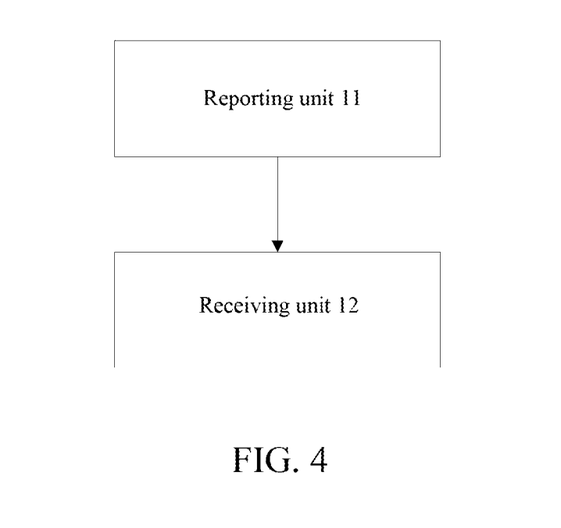
FIG. 4 is a block diagram of a component structure of a user equipment embodiment of the present document.

The present document provides a user equipment, and as shown in FIG. 4, the user equipment includes a reporting unit 11 and a receiving unit 12.

The reporting unit 11 is arranged to report area identifier information of a user equipment when the user equipment which is ready to receive trunked service data through a multimedia broadcast/multicast service (MBMS) bearer moves between a cell inside an MBMS single frequency network (MBSFN) area at which a trunked service is located and a cell outside the MBMFN area. The receiving unit 12 is arranged to receive the trunked service data according to a trunked service bearing mode selected by a network side based on the received area identifier information.

In an alternative implementation mode of the embodiment of the present document, the receiving unit is further arranged to receive the trunked service data through a unicast bearer when the trunked service bearing mode is the unicast bearer, or receive the trunked service data through the MBMS bearer when the trunked service bearing mode is the MBMS bearer.

In an alternative implementation mode of the embodiment of the present document, the reporting unit further includes a determining sub-unit. The determining sub-unit is arranged to determine that the user equipment leaves the MBSFN area by any one of the following ways: the user equipment does not find or is unable to read in a local cell or an adjacent cell a related system broadcast message which is for configuring MBMS parameters; the user equipment does not find or is unable to read a multicast control channel (MCCH) in a local cell or an adjacent cell; the user equipment finds in a local cell or an adjacent cell by reading a system broadcast message that a MBMS area to which the local cell or the adjacent cell belongs does not belong to a broadcast area of the trunked service; and the user equipment does not have configuration parameters of the trunked service in an MCCH read in a local cell or an adjacent cell.

In an alternative implementation mode of the embodiment of the present document, the reporting unit further includes: a reporting sub-unit. The reporting sub-unit is arranged to report the area identifier information of the user equipment at least using a manner of an application layer signaling or an evolved packet system (EPS) signaling; and the EPS signaling includes an air interface signaling and an evolved packet core network (EPC) signaling.

In an alternative implementation mode of the embodiment of the present document, the area identifier information is an identifier of a cell at which the user equipment is located.

In an alternative implementation mode of the embodiment of the present document, the area identifier information includes at least one of a trunked service identifier and a Boolean identifier.

In an alternative implementation mode of the embodiment of the present document, the area identifier information further includes at least one of an MBMS service area identifier (SAI) and a geographic position identifier.

Figure 5:
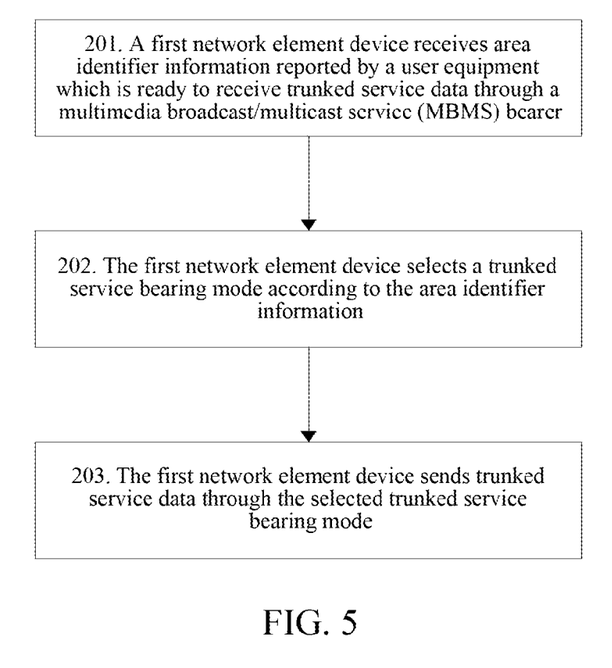
FIG. 5 is a flow chart of an implementation of another method embodiment of the present document.

An embodiment of the present document provides a method for LTE trunking communication, and as shown in FIG. 5, the method includes the following steps.

In a step 201: a first network element device receives area identifier information reported by a user equipment which is ready to receive trunked service data through a multimedia broadcast/multicast service (MBMS) bearer;

In a step 202: the first network element device selects a trunked service bearing mode according to the area identifier information; and In a step 203: the first network element device sends the trunked service data through the selected trunked service bearing mode.

In an alternative implementation mode of the embodiment of the present document, the step 202 may include the following steps. The first network element device judges whether to use a unicast bearer according to the area identifier information, selects the unicast bearer as the trunked service bearing mode if determining that there is no available MBMS bearer or establishable MBMS bearer, and selects the MBMS bearer as the trunked service bearing mode if determining that there is an available MBMS bearer or establishable MBMS bearer.

In an alternative implementation mode of the embodiment of the present document, it is determined that there is the available MBMS bearer if the user equipment is in an MBMS coverage area and a trunked service has not begun yet; and it is determined that there is the establishable MBMS bearer if the user equipment is not in an MBMS coverage area, a trunked service has not begun yet, and a network is able to configure a cell at which the user equipment is located as a new MBMS single frequency network (MBSFN) area or enlarge the original MBSFN area containing the cell at which the user equipment is located.

In an alternative implementation mode of the embodiment of the present document, in the case that the user equipment moves to the outside of the MBSFN area and sends the area identifier information, the step 203 may include: the first network element device judges whether to send the trunked service data through the MBMS bearer, the first network element device sends indication information to a second network element device if yes, and sends the trunked service data through a unicast bearer if no.

In an alternative implementation mode of the embodiment of the present document, the method further includes the following steps. After the first network element device sends the indication information to the second network element device, the second network element device judges whether to establish a new MBSFN area, configures the newly established MBSFN area to send the trunked service data if yes, and modifies the original MBSFN area to send the trunked service data if no.

In an alternative implementation mode of the embodiment of the present document, in the case that the user equipment moves back to the MGSFN area and sends the area identifier information, the step that the first network element device sends the trunked service data through the selected trunked service bearing mode includes the following steps. The first network element device judges whether to send the trunked service data through the MBMS bearer, the first network element device sends the trunked service data through the MBMS bearer if yes, and the first network element device sends indication information to a second network element device if no.

In an alternative implementation mode of the embodiment of the present document, the method further includes: after the first network element device sends the indication information to the second network element device, the second network element device modifies the MBSFN area, and the first network element device sends the trunked service data through the unicast bearer.

Figure 6:
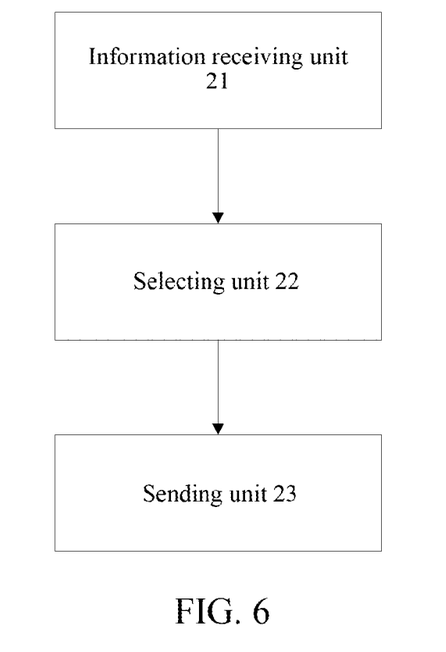
FIG. 6 is a block diagram of a component structure of a first network element embodiment of the present document.

An embodiment of the present document provides a first network element device, and as shown in FIG. 6, the first network element device includes an information receiving unit 21, a selecting unit 22 and a sending unit 23.

The information receiving unit 21 is arranged to receive area identifier information reported by a user equipment which is ready to receive trunked service data through a multimedia broadcast/multicast service (MBMS) bearer.

The selecting unit 22 is arranged to select a trunked service bearing mode according to the area identifier information.

The sending unit 23 is arranged to send the trunked service data through the selected trunked service bearing mode.

In an alternative implementation mode of the embodiment of the present document, the selecting unit is arranged to judge whether to use a unicast bearer according to the area identifier information, select the unicast bearer as the trunked service bearing mode if determining that there is no available MBMS bearer or establishable MBMS bearer, and select the MBMS bearer as the trunked service bearing mode if determining that there is an available MBMS bearer or establishable MBMS bearer.

In an alternative implementation mode of the embodiment of the present document, it is determined that there is the available MBMS bearer if the user equipment is in an MBMS coverage area and a trunked service has not begun yet; and it is determined that there is the establishable MBMS bearer if the user equipment is not in an MBMS coverage area, a trunked service has not begun yet, and a network is able to configure a cell at which the user equipment is located as a new MBMS single frequency network (MBSFN) area or enlarge the original MBSFN area containing the cell at which the user equipment is located.

In an alternative implementation mode of the embodiment of the present document, the sending unit is arranged to, in the case that the user equipment moves to the outside of the MBSFN area and sends the area identifier information, judge whether to send the trunked service data through the MBMS bearer, send indication information to a second network element device if yes, and send the trunked service data through a unicast bearer if no.

In an alternative implementation mode of the embodiment of the present document, the first network element device further includes an indication unit. The indication unit is arranged to, after the first network element device sends the indication information to the second network element device, receive an indication sent after the second network element device judges whether to establish a new MBSFN area, indicate to send the trunked service data in the newly established MBSFN area if yes, and indicate to modify the original MBSFN area and send the trunked service data if no.

In an alternative implementation mode of the embodiment of the present document, the sending unit is arranged to, in the case that the user equipment moves back to the MGSFN area and sends the area identifier information, judge whether to send the trunked service data through the MBMS bearer, send the trunked service data through the MBMS bearer if yes, and send indication information to a second network element device if no.

In an alternative implementation mode of the embodiment of the present document, the first network element device further includes an indication unit. The indication unit is arranged to, after the first network element device sends the indication information to the second network element device, receive an indication that the second network element device modifies the MBSFN area and the first network element device sends the trunked service data through the unicast bearer.

In summary, in the embodiment of the present document, the UE registered to GCSE services is ready to receive the GCSE services through a pre-established MBMS bearer;

before the commencement of the GCSE service, when the UE moves between different cells inside and outside the MBSFN area where the GCSE services are located, the UE sends identifier information of the area to the network (such as a GCSE AS, an EPS network element, a trunked service dispatching desk, etc., the GCSE AS is used as an example in the subsequent embodiments of the present document); and an AS (the GCSE AS is called AS for short in the subsequent embodiments of the present document) that has received the information selects a bearing mode for the trunked service sent to the UE and send the trunked service through the selected bearing mode. Through the embodiment of the present document, the problem of implementing trunking communication inside and outside the MBMS coverage area can be solved, transmission of the trunked service inside and outside the MBSFN area can be implemented, the size of the MBSFN area is adjusted, and the load of the trunked service is reduced, thereby decreasing the influence on wireless access networks.

The embodiments of the present document will be described in detail below using various scenarios. In the case of no specific explanation, the MBMS in the embodiments of the present document refers to evolved MBMS (eMBMS) and the AS refers to GCSE AS.

Figure 7:
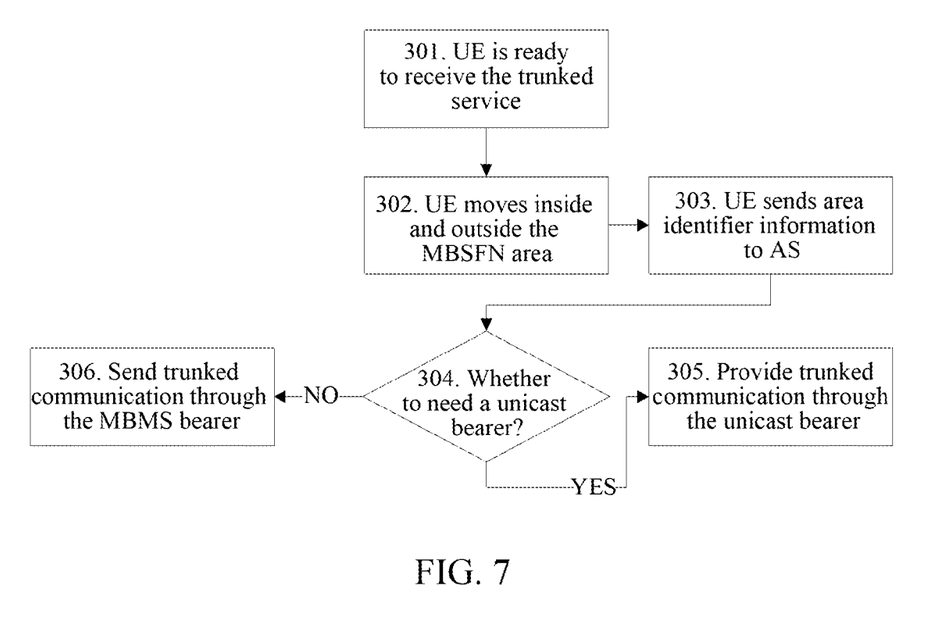
FIG. 7 is a flow chart of a scenario one applying an embodiment of the present document.

Scenario one: a complete process of interaction between a user side and a network side to implement a method for LTE trunking communication, and as shown in FIG. 7, the method includes the following steps.

In a step 301: a trunked UE (group member) is ready to receive a trunked service through an MBMS bearer.

Before the step 301, the trunked UE is first registered to a GCSE AS. Thus, the GCSE AS can know how many UEs in total join one trunked service.

In the embodiments of the present document, MBMS bearer, MBSFN bearer, multicast bearer and point to multipoint bearer are the same concept.

The UE is ready to receive the trunked service, that is, the UE joins the trunked service and becomes a group member of the trunked service (the group member is called UE for short in the embodiments of the present document). The GCSE AS may know which group members (i.e., which UEs) are in a certain trunked service through the registration process of the UE.

The UE being ready to receive the trunked service through the MBMS bearer means that the UE is in the MBMS coverage area (MBSFN area) and the MBMS bearer is pre-established before the commencement of the trunked service. (Pre-establishing means that the AS has established the MBMS bearer for the trunked service before the commencement of the trunked service. For example, a BM-SC allocates a TMGI for the service and informs the AS through a GC2 interface, and the AS informs the UE through a GC1 interface; the BM-SC establishes the MBMS bearer for the service according to the existing 3GPP protocol. A USD includes information such as the TMGI of the service, a corresponding SA list, and corresponding frequency, etc. the UE can read, on a MCCH, configuration information of the TMGI in the MBSFN area. The UE reads the USD to obtain an SAI list and frequency corresponding to the TMGI of the service. The UE reads SIB13 of its current resident cell to obtain configuration information of the MCCH, and then the UE reads contents of the MCCH. If configuration parameters of the TMGI are included in the contents of the MCCH, the UE further reads an MTCH bearing the contents of the TMGI. In brief, when the UE can, in the MBSFN area to which the current cell belongs, bear the TMGI on the correctly read MCCH, the UE determines a multicast bearer supported by itself), the UE receives MBMS bearer control information and the trunked service has not commenced yet.

The UE has a trunking communication ability and an MBMS ability, (in which there are some UEs may have the trunking communication ability only but no MBMS ability. In theory, the so-called trunking communication ability may be to add one trunking communication client at an application layer of the UE. For example, the Rel8 UE does not support the MBMS ability, but may have the trunking communication ability. Such UE can only receive the trunked service through PTP, even if it falls within the MBMS area. Only the UE have both the trunking communication ability and the MBMS ability is referred in the present document.) The UE includes a user terminal and a dispatching desk. The user terminal includes a handhold terminal, a vehicle mounted station and a mounting plate, and the dispatching desk includes a wired dispatching desk and a wireless dispatching desk. The user terminal and the wireless dispatching desk are connected with an LTE network via an air interface and the wired dispatching desk is connected with a network sub-system via a trunked gateway.

The MBMS bearer includes a core network bear (i.e., EPC bearer) and an air interface bearer; an RAN (an eNB and/or an MCE) configures MBMS air interface resources and sends MBMS configuration information and trunked data via an air interface.

In step 302: the UE moves between cells inside and outside the MBSFN area.

The UE is in an RRC idle state or RRC connected state; the UE moves to the outside of the MBSFN area, i.e., the UE is not within the coverage range of the MBSFN area. In practical networks, different trunked services may be configured in different MBSFN areas. For the sake of convenience of description, the MBSFN area mentioned in the embodiments of the present document refers to the MBSFN area bearing the trunked service in step 301.

The UE can judge whether the UE belongs to a certain specific SA by reading SIB15 of the resident cell, and the UE reports area identifier information to the AS. In addition, the UE may further read the SIB13 of the resident cell, and may know whether it is the UE which belongs to the specific MBSFN area. The ways of determining that the UE leaves the MBSFN area include the following ways:

1) The UE does not find or cannot read, in its cell or an adjacent cell, related system broadcast messages (such as SIB13 or SIB15) which configure MBMS parameters; or 2) The UE does not find or cannot read multicast control channels (MCCHs) in its cell or an adjacent cell; or 3) The UE finds, in its cell or an adjacent cell by reading system broadcast messages (such as SIB 15), that a MBMS area (SAI, service area ID) to which its cell or the adjacent cell belongs does not belong to a broadcast area of the trunked service; or 4) The UE does not have configuration parameters of the trunked service in reading MCCHs in its cell or an adjacent cell.

In step 303: the UE sends the area identifier information to the AS.

The area identifier information is sent via GC1 interface signaling.

The US transits from the idle state to the connected state (if it is originally in the idle state). The UE sends the area identifier information to the AS by any one of application signaling and EPS signaling, herein the EPS signaling includes air interface signaling and EPC signaling. When the sending of the identifier information is completed, the UE returns to the idle state.

The area identifier information is an identifier of a cell where the UE is located, i.e., an E-URTAN cell identifier (ECI). The ECI in LTE is 28 bits. The area identifier information is used to represent the cell where the UE is located. That is, the AS can determine the cell where the UE is located as soon as the AS receives the identifier information.

The area identifier information sent by the UE (the indication information indicates whether a multicast bearer for a certain specific trunked service is supported) includes any one or two of a trunked service identifier and a Boolean identifier. The trunked service identifier is used to indicate the trunked service that the UE is ready to receive and the Boolean identifier is used to indicate whether the UE can receive the MBMS bearer. Suppose that True indicates that the UE can receive the multicast bearer and False indicates that the UE cannot receive the multicast bearer, as shown in Table 1, then the indication information sent by the UE includes the following several combinations (each trunked service being indicated using the following combinations, i.e., the so-called True is for a certain trunked service):

TABLE 1

| ECI | UE is located in ECI |
|---|---|
| True + ECI (and/or geographical coordinate) | UE can receive multicast bearer and is located in ECI |
| False + ECI (and/or geographical coordinate) | UE cannot receive multicast bearer and is located in ECI |

When the US moves from a cell an outside the MBSFN area to another cell b, the UE also sends the area identifier information to the AS, i.e., an identifier of the cell b (ECI) {trunked service 1, area identifier information (ECI2)}.

If the reported information has only the cell identifier ECI information, then the network side judges whether the ECI belongs to the SA/MBSFN area according to the configuration information of the SA/MBSFN area in which the trunked service is sent, meanwhile the network side judges whether the UE can receive the MBMS bearer in the SA/MBSFN area according to contract/registration information of the UE.

When the UE moves back to the MBSFN area from the outside of the MBSFN area for the first time, the UE sends to the AS a cell identifier ECI indicating that the UE returns to the original MBSFN area, i.e., {trunked service 1, True, area identifier information ECI1}.

When the UE moves between cells inside the MBSFN area, the UE reports an identifier ECI {trunked service 1, True, area identifier information ECI2} of a cell where it is located to the AS; the AS can reconfigure the MBSFN area according to the number of trunked users in cells in the MBSFN area. For example, the AS can decrease the number of the cells in the MBSFN area and send trunked services to UEs in cells which do not belong to the MBSFN area by establishing a unicast bearer.

The area identifier information may further include one or two of an MBMS service area identifier (SAI) and a geographic position identifier (such as information of coordinate, longitude, latitude, etc.).

Figure 8:
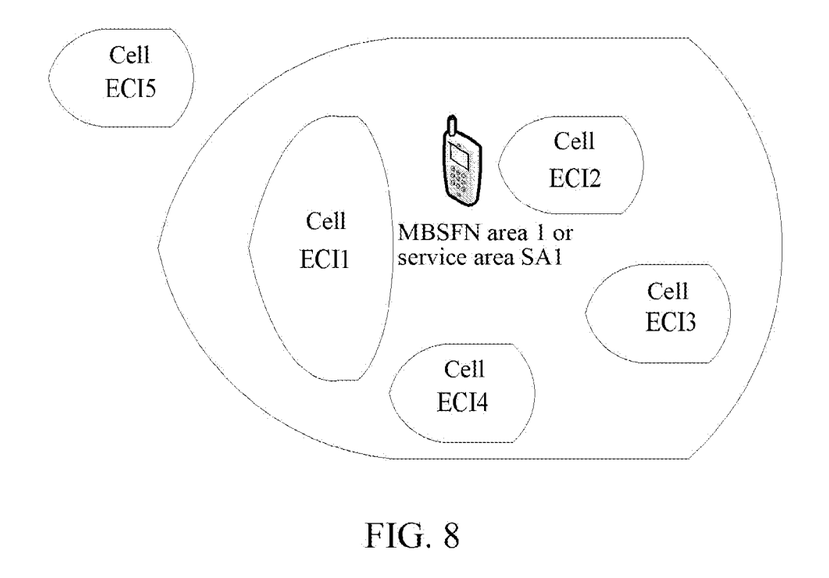
FIG. 8 is a schematic diagram of a UE layout of a trunking communication.

As shown in FIG. 8, the original MBSFN area1/SA1 contains 4 cells={ECI1, ECI2, ECI3, ECI4}. When it is found that the number of UEs in the ECI2 is lower than a certain given threshold, according to the information reported by the UEs, MBSFN area1/SA1={ECI1, ECI3, ECI4} is adjusted, that is, the ECI2 is deleted from the original MBSFN area1/SA1, and the area of the MBSFN area1/SA1 becomes smaller. When there are a few UEs (group members (UEs) belonging to the trunk service group) in the ECI2, the AS establishes a PTP bearer for these UEs. Similarly, ECI5 is outside of the MBSFN area/SA1, if it is found that the number of UEs in the ECI5 is higher than a certain given threshold, according to the information reported by the UEs, MBSFN area1/SA1={ECI1, ECI2, ECI3, ECI4, ECI5} is adjusted, or a new. MBSFN area2={ECI5} is established, and the AS sends trunked services to the UEs in the ECI5 through the MBMS bearer.

In step 304: the AS judges whether the unicast bearer is required to be established for the UE. Step 305 is performed if yes, and step 306 is performed if no.

After receiving the area identifier information of the UE, the AS judges whether the unicast bearer is required to be established for the UE, by judging whether there is an available MBMS bearer (i.e., an MBMB bearer relative to a unicast bearer, called point to multipoint (PTM) bearer as well) or an establishable MBMS bearer. The available MBMS bearer means that the UE is in the MBMS coverage area (which is the MBSFN area) and the trunked service has not commenced yet; and the establishable MBMS bearer means that the UE is not in the MBMS coverage area, the trunked service has not commenced yet and the network can configure the cell where the UE is located as a new MBSFN area or enlarge the original MBSFN area containing the cell where the UE is located. If there is no available or establishable MBMS bearer, then a unicast bearer is established, and if there is an available or establishable MBMS bearer, then the MBMS bearer continues to be used.

In step 305: the AS sends the trunked service to the UE through the unicast bearer.

The AS judges whether the unicast bearer is used according to the area identifier information of the UE and local information. If there is no available or establishable MBMS bearer, then the AS chooses to send the trunked service through the unicast bearer.

The UE receives the trunked service data through the unicast bearer.

In step 306: the AS sends the trunked service to the UE through the MBMS bearer.

The AS sends the trunked service to the UE through the existing MBMS bearer or the newly established MBMS bearer.

Figure 9:
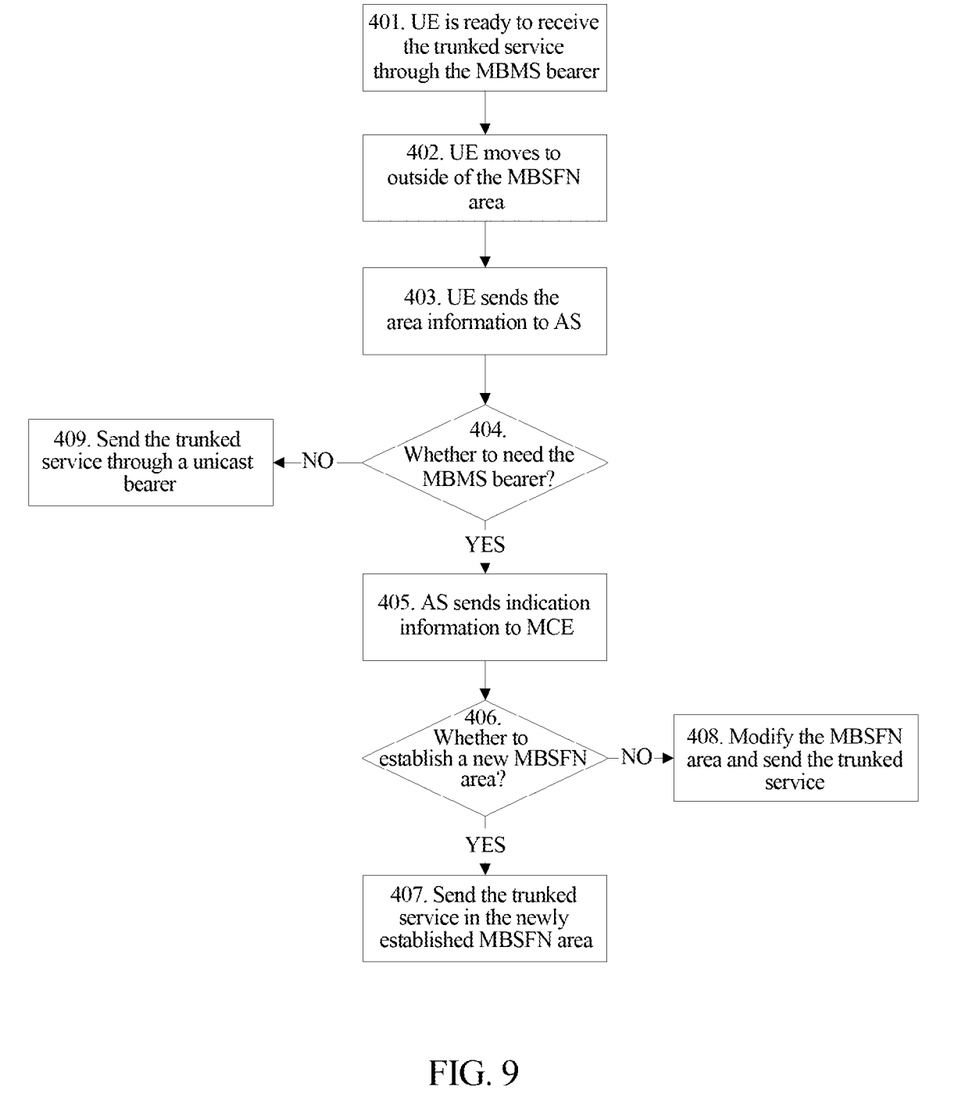
FIG. 9 is a flow chart of a scenario two applying an embodiment of the present document.

If the MBSFN area is adjusted, for example, the MBSFN area is enlarged or a new MBSFN area containing the cell where the UE is located is established, then the AS sends the trunked service through the newly established MBMS bearer Scenario two: a situation that the UE moves to the outside of the MBSFN area from the inside of the MBSFN area to implement a method for LTE trunking communication, and as shown in FIG. 9, the method includes the following steps.

In step 401: the UE is ready to receive the trunked service through the MBMS bearer.

The UE is in the MBMS coverage area and is ready to receive the trunked service by registering to the AS. The trunked service has not commenced yet.

In step 402: the UE moves to the outside of the MBSFN area.

In step 403: the UE reports an identifier of a cell where it is located to the AS.

The cell identifier is reported by any one of application signaling and EPS signaling and sent to the AS, herein the EPS signaling including air interface signaling and EPC signaling. When the sending of the identifier information is completed, the UE returns to the idle state. The cell identifier is ECI.

The UE may be in the idle state or the connected state. If the UE is in the idle state, then it first enters the connected state to report the cell identifier, and returns to the idle state after the reporting is completed.

In step 404: the AS judges whether the trunked service is sent through the MBMS bearer, step 405 is performed if yes, and step 409 is performed if no.

The AS judges whether the trunked service is sent through the MBMS bearer, according to the received number of UEs in the cell. If the number of the UEs exceeds a threshold, then the trunked service is sent through the MBMS bearer, i.e., a single cell MBSFN area is configured. If the number of the UEs does not exceed the threshold, then the trunked service is sent through the unicast bearer.

In step 405: the AS sends indication information to an MCE through an EPC.

The EPC includes a BM-SC, an MBMS-GW and an MME, herein the MME sends the indication information to the MCE via an M3 interface. The indication information is used for indicating that the trunked service is sent using the MBMS bearer.

In step 406: the MCE judges whether a new MBSFN area is established. Step 407 is performed if yes and step 408 is performed if no.

The MCE judges whether the new MBSFN area is established or the original MBSFN area is modified according to OAM information or strategies of operators.

In step 407: the MCE established a new single cell MBSFN area and the AS sends the trunked service through the MBMS bearer.

The single cell MBSFN area uses an identifier different from that of the original MBSFN area. The AS sends the trunked service to the UE in the single cell MBSFN area through the MBMS bearer.

In step 408: the MCE modifies the original MBSFN area and the AS sends the trunked service data in the MBSFN area.

The modifying means that the cell where the UE is located is placed into the MBSFN area, the MBSFN area uses the original MBSFN area identifier, and the AS sends the trunked service to the UE in the new MBSFN area.

In step 409: the AS establishes a unicast connection to the UE and sends the trunked service through the unicast bearer.

The AS sends the trunked service data through the unicast bearer and the UE receives the trunked service data through the unicast bearer.

Figure 10:
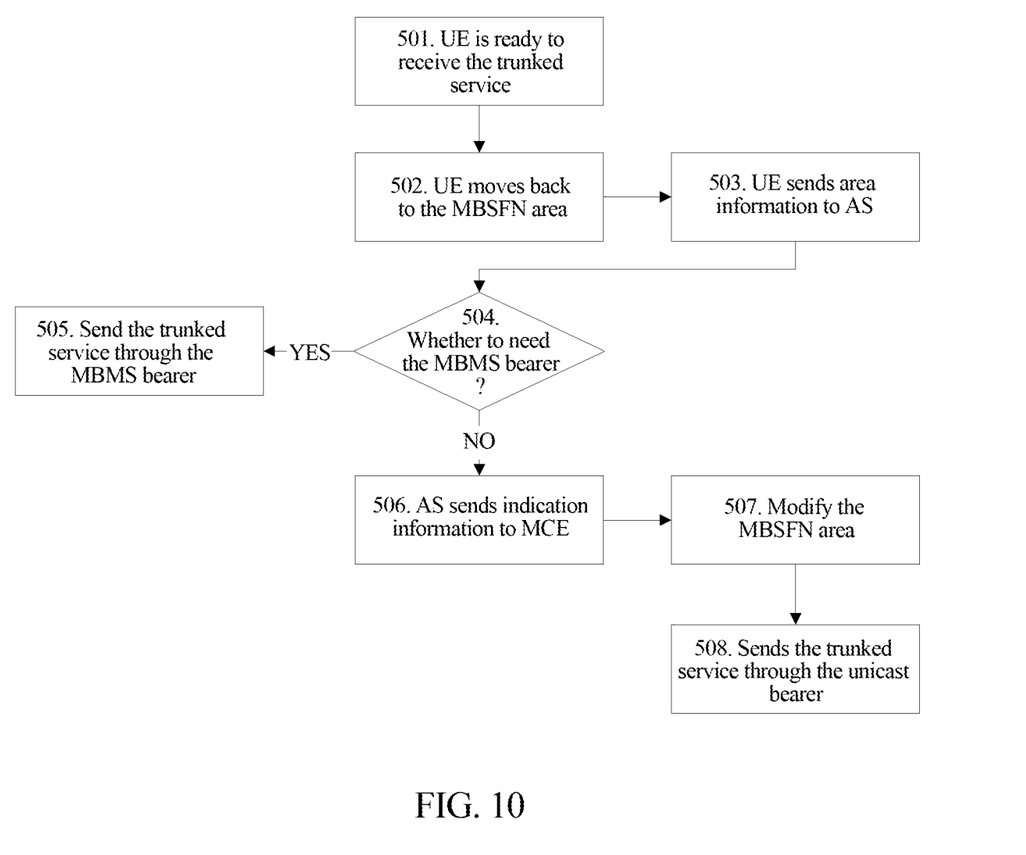
FIG. 10 is a flow chart of a scenario three applying an embodiment of the present document.

Scenario three: a situation that the UE moves to the inside of the MBSFN area from the outside of MBSFN area to implement a method for LTE trunking communication, and as shown in FIG. 10, the method includes the following steps.

In step 501: the UE is ready to receive the trunked service from the outside of the MBSFN area.

This step is the same as step 301 and will not be repeated herein.

In step 502: the UE moves back to the inside the MBSFN area from the outside of the MBSFN area.

The UE determines to move back to the MBSFN area by the following ways:

1) The UE finds and reads, in its cell, the related system broadcast messages (such as SIB13 or SIB15) configuring MBMS parameters, and the UE finds, in its cell by reading the system broadcast messages (such as SIB15), that an MBMS area (SAI, service area ID), to which its cell belongs, belongs to a broadcast area of the trunk service; or 2) The UE reads an MCCH in its cell and finds configuration parameters of the required trunked service.

In step 503: the UE sends identifier information of an area where it is located to the AS.

The UE returns to the MBSFN area for the first time and sends an cell identifier ECI and MBMS area identifier to the AS, herein the MBMS area identifier is used for indicating to the AS that the UE returns to the MBSFN area and the ECI is used for indicating the position of the cell where the UE is located in the MBSFN area such that the AS can select a bearing mode according to the number of UEs in the cell to send the trunked service.

When the UE moves between different cells in the MBSFN area, it reports an identifier ECI of a cell where it is located to the AS.

In step 504: the AS judges whether the trunked service is sent through the MBMS bearer, step 505 is performed if yes and step 506 is performed if no.

The AS judges whether the trunked service is sent through the MBMS bearer according to the number of UEs in the cell and the local strategies. For example, if the number of the UEs is lower than a threshold and the local strategies allow adjusting a dynamic MBSFN area, and then the AS can choose to send the trunked service through the unicast bearer. If the number of the UEs is higher than the threshold and the local strategies does not allow adjusting the dynamic MBSFN area, then the AS chooses to send the trunked service through the MBMS bearer.

In step 505: the AS sends the trunked service through the MBMS bearer.

The AS sends the trunked service through the existing MBMS bearer.

In step 506: the AS sends indication information to an MCE through an EPC.

The EPC includes a BM-SC, an MBMS-GW and an MME, herein the MME sends the indication information to the MCE via an M3 interface. The indication information is used for indicating that the existing MBMS bearer is modified.

In step 507: the MCE modifies the MBSFN area.

The modifying means that the cell where the UE is located is excluded from the MBSFN area, a new MBSFN area uses the original MBSFN area identifier, and MBMS data is not sent in the cell where the UE is located.

In step 508: the AS establishes the unicast bearer with the UE and sends the trunked service.

It should be noted that when the UE moves between cells outside the MBSFN area, it reports area identifier information to the AS. Similarly, when the UE moves between cells inside the MBSFN area, it also reports area identifier information to the AS.

Figure 11:
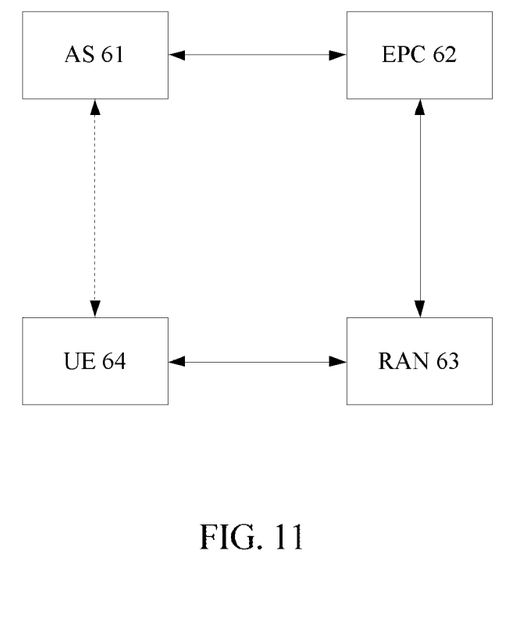
FIG. 11 is a schematic diagram of communication between a network side device and a user equipment involved in an embodiment of the present document.

A schematic diagram of communication between a network side device and user equipment involved in an embodiment of the present document is shown in FIG. 11, and includes a first network element device, AS 61, an EPC 62, an RAN 63 and a UE 64.

The first network element device, AS 61, is arranged to receive area identifier information sent by the UE 63, send indication information to a second network element device MCE through the EPC 62, select a trunked service bearing mode, modify an MBMSF coverage area, establish a unicast bearer and send trunked service data.

The EPC 62 includes a BM-SC, an MBMS-GW and an MME, and is arranged to forward control information between the AS 61 and the UE 63, receive the indication information sent by the AS 61 to provide it to the second network element device MCE, which decides whether a new MBSFN area is established.

The RAN 63 includes the second network element device MCE and an eNB, and is arranged to configure the MBSFN area and send the trunked service data and configuration information to the UE 64.

The UE 64 is arranged to judge whether it is located in the MBSFN area, send identifier information of an area at which it is located to the AS 61 and receive the trunked service data sent by the AS 61.

Acronyms involved in this article and accompanying figures thereof are as follows:

PCRF: Policy and Charging Rules Function;
HSS: Home Subscriber Server;
S/P-GW refers to S-GW, which is a serving gateway, or P-GW, which is a packet data gateway;
MME: Mobility Management Entity;
E-UTRAN: evolved universal terrestrial radio access network;
eNB: evolved node B;
PDN: Public Data Network
MCE: Multi-VPN-Instance CE;
MuSe: Multipoint Service;
AS: Application Server;
EPC: Evolved Packet Core network;
EPS: Evolved Packet System;
ECI: E-UTRAN Cell Identifier;
MBMS: Multimedia Broadcast/Multicast Service;
GCSE: Group Communication Service Enabler;
BM-SC: Broadcast Multicast-Service Centre;
MBMS-GW: MBMS-GateWay;
MBSFN: MBMS over a Single Frequency Network
OAM: Operation Administration and Maintenance;
QoS: Quality of Service;
PTP: Point To Point;
PTM: Point To Multipoint;
RRC: Radio Resource Control;
SAI: Service Area Identifier;
TMGI: Temporary Mobile Group Identity; and
USD: User Service Description.

The integrated modules described in the embodiments of the present document, when implemented in the form of software functional modules and sold or used as independent products, may be stored in a computer readable storage medium. Based on such understanding, the technique scheme of the embodiments of the present document essentially or parts thereof which make contributions to the prior art may be embodied in the form of software products. The computer software products are stored in a storage medium containing a number of instructions for causing a computing device (which may be a person computer, server or network device) to execute all or part of the methods described in various embodiments of the present document. The storage medium described above includes various media capable of storing program codes, such as a U disk, a removable hard disk, a read only memory (ROM), a magnetic disk or an optical disk. Thus, the embodiments of the present document are not limited to any specific combination of hardware and software.

Accordingly, an embodiment of the present document further provides a computer readable storage device having stored computer programs herein for executing the methods for LTE trunking communication, the user equipment and the first network element device in accordance with the embodiments of the present document.

The above description is the alternative embodiments of the present document only and is not intended to limit the protection scope of the present document.

INDUSTRIAL APPLICABILITY

Using the embodiments of present document, when the position of the UE is changed and the UE moves between the different cells inside and outside the MBSFN area where the trunked service is located, the area identifier information of the user equipment will be reported to the network side, which will send the trunked service bearing mode to the UE, such that the UE can receive the trunked service data according to the trunked service bearing mode, so as to ensure that the UE can receive the required trunked service in time.

What we claim is:

1. A method for LTE trunking communication, comprising:
    reporting area identifier information of a user equipment when the user equipment, which is ready to receive trunked service data through a multimedia broadcast/multicast service (MBMS) bearer, moves between a cell inside an MBMS single frequency network (MBSFN) area at which a trunked service is located and a cell outside the MBMFN area; and
    receiving, by the user equipment, the trunked service data according to a trunked service bearing mode selected by a network side based on the received area identifier information; wherein the network side selecting the trunked service bearing mode according to the area identifier information comprises: the network side judging whether to use a unicast bearer according to the area identifier information, selecting the unicast bearer as the trunked service bearing mode if determining that there is no available MBMS bearer or establishable MBMS bearer, and selecting the MBMS bearer as the trunked service bearing mode if determining that there is an available MBMS bearer or establishable MBMS bearer; wherein,
    determining that there is the available MBMS bearer if the user equipment is in an MBMS coverage area and a trunked service has not begun yet; and
    determining that there is the establishable MBMS bearer if the user equipment is not in an MBMS coverage area, a trunked service has not begun yet, and a network is able to configure a cell at which the user equipment is located as a new MBSFN area or enlarge an original MBSFN area containing the cell at which the user equipment is located.

2. The method according to claim 1, wherein the user equipment receiving the trunked service data according to the trunked service bearing mode selected by the network side based on the received area identifier information comprises:
    the user equipment receiving the trunked service data through a unicast bearer when the trunked service bearing mode is the unicast bearer; or
    the user equipment receiving the trunked service data through the MBMS bearer when the trunked service bearing mode is the MBMS bearer.

3. The method according to claim 1, further comprising: the user equipment determining to leave the MBSFN area by any one of the following ways:
    the user equipment does not find or is unable to read in a local cell or an adjacent cell a related system broadcast message which is for configuring MBMS parameters;
    the user equipment does not find or is unable to read a multicast control channel (MCCH) in a local cell or an adjacent cell;

the user equipment finds in a local cell or an adjacent cell by reading a system broadcast message that a MBMS area to which the local cell or the adjacent cell belongs does not belong to a broadcast area of the trunked service; and the user equipment does not have configuration parameters of the trunked service in an MCCH read in a local cell or an adjacent cell.

4. The method according to claim 1, wherein the area identifier information of the user equipment is reported using a manner of an application layer signaling or an evolved packet system (EPS) signaling; and the EPS signaling comprises an air interface signaling and an evolved packet core network (EPC) signaling.

5. The method according to claim 1, wherein the area identifier information is an identifier of a cell at which the user equipment is located.

6. The method according to claim 1, wherein the area identifier information comprises at least one of a trunked service identifier and a Boolean identifier.

7. The method according to claim 6, wherein the area identifier information further comprises at least one of an MBMS service area identifier (SAI) and a geographic position identifier.

8. A method for LTE trunking communication comprising:

receiving, by a first network element device, area identifier information reported by a user equipment which is ready to receive trunked service data through a multimedia broadcast/multicast service (MBMS) bearer;

selecting, by the first network element device, a trunked service bearing mode according to the area identifier information; and sending, by the first network element device, the trunked service data through the selected trunked service bearing mode; wherein the first network element device selecting the trunked service bearing mode according to the area identifier information comprises:

the first network element device judging whether to use a unicast bearer according to the area identifier information, selecting the unicast bearer as the trunked service bearing mode if determining that there is no available MBMS bearer or establishable MBMS bearer, and selecting the MBMS bearer as the trunked service bearing mode if determining that there is an available MBMS bearer or establishable MBMS bearer, the method further comprising:

determining that there is the available MBMS bearer if the user equipment is in an MBMS coverage area and a trunked service has not begun yet and determining that there is the establishable MBMS bearer if the user equipment is not in an MBMS coverage area, a trunked service has not begun yet, and a network is able to configure a cell at which the user equipment is located as a new MBMS single frequency network (MBSFN) area or enlarge the original MBSFN area containing the cell at which the user equipment is located.

9. The method according to claim 8, wherein in the case that the user equipment moves to the outside of the MBSFN area and sends the area identifier information, the first network element device sending the trunked service data through the selected trunked service bearing mode comprises:

the first network element device judging whether to send the trunked service data through the MBMS bearer, the first network element device sending indication information to a second network element device if yes, and sending the trunked service data through a unicast bearer if no.

10. The method according to claim 9, further comprising:

after the first network element device sends the indication information to the second network element device, the second network element device judging whether to establish a new MBSFN area, configuring the newly established MBSFN area to send the trunked service data if yes, and modifying the original MBSFN area to send the trunked service data if no.

11. The method according to claim 8, wherein in the case that the user equipment moves back to the MBSFN area and sends the area identifier information, the first network element device sending the trunked service data through the selected trunked service bearing mode comprises:

the first network element device judging whether to send the trunked service data through the MBMS bearer, sending the trunked service data through the MBMS bearer if yes, and the first network element device sending indication information to a second network element device if no;

the method further comprises: after the first network element device sends the indication information to the second network element device, the second network element device modifying the MBSFN area, and the first network element device sending the trunked service data through the unicast bearer.

12. A computer program comprising program instructions, enabling a user equipment, when the program instructions are executed by the user equipment, to execute the method according to claim 1.

* * * * *